US008777494B2

(12) United States Patent
Arnault (10) Patent No.: US 8,777,494 B2
(45) Date of Patent: Jul. 15, 2014

(54) ROLLING BEARING, ITS USE, AND A MOTOR VEHICLE FITTED WITH SUCH A ROLLING BEARING

(75) Inventor: Benoit Arnault, Saint Cyr sur Loire (FR)

(73) Assignee: Aktiebolaget SKF, Gothenburg (SE)

( * ) Notice: Subject to any disclaimer, the term of this patent is extended or adjusted under 35 U.S.C. 154(b) by 314 days.

(21) Appl. No.: 13/119,396

(22) PCT Filed: Sep. 15, 2009

(86) PCT No.: PCT/EP2009/061926
§ 371 (c)(1),
(2), (4) Date: Apr. 15, 2011

(87) PCT Pub. No.: WO2010/031757
PCT Pub. Date: Mar. 25, 2010

(65) Prior Publication Data
US 2011/0188797 A1    Aug. 4, 2011

(51) Int. Cl.
*F16C 33/78*    (2006.01)
*F16D 23/14*    (2006.01)

(52) U.S. Cl.
USPC ............... 384/607; 384/612; 192/110 B (58) Field of Classification Search
USPC ......... 384/495, 496, 497, 517, 520, 547, 612, 384/615, 616, 617, 620; 192/85.51, 89.23, 192/98, 110 B
See application file for complete search history.

(56) References Cited

U.S. PATENT DOCUMENTS

| | | | | |
|---|---|---|---|---|
| 4,364,615 A * | 12/1982 | Euler | ............... | 384/517 |
| 4,608,741 A * | 9/1986 | Mallet | ............... | 29/450 |
| 4,643,286 A * | 2/1987 | Lassiaz | ............... | 192/98 |
| 4,852,710 A * | 8/1989 | Gay et al. | ............... | 192/98 |
| 5,967,283 A * | 10/1999 | Kemper | ............... | 192/89.23 |
| 6,179,473 B1 * | 1/2001 | Ponson et al. | ............... | 384/537 |
| 6,464,060 B1 * | 10/2002 | Ponson et al. | ............... | 192/98 |
| 7,222,709 B2 * | 5/2007 | Arnault | ............... | 192/98 |
| 7,228,951 B2 * | 6/2007 | Arnault | ............... | 192/98 |
| 8,485,734 B2 * | 7/2013 | Arnault et al. | ............... | 384/607 |
| 2004/0020743 A1 * | 2/2004 | Dittmer et al. | ............... | 192/98 |
| 2012/0039556 A1 * | 2/2012 | Arnault et al. | ............... | 384/513 |

FOREIGN PATENT DOCUMENTS

| | | |
|---|---|---|
| DE | 10148388 A1 | 4/2003 |
| FR | 2544429 A1 | 10/1984 |
| FR | 2584788 A1 | 1/1987 |
| FR | 2619880 A1 | 3/1989 |

OTHER PUBLICATIONS

Machine translation of DE 10148388 obtained on Jun. 13, 2013.*

* cited by examiner

*Primary Examiner* — Thomas R Hannon
*Assistant Examiner* — Adam D Rogers
(74) *Attorney, Agent, or Firm* — Bryan Peckjian; SKF USA Inc. Patent Department (57) ABSTRACT

This rolling bearing (1) comprises an inner ring (2), an outer ring (3), rolling members (5) placed in a rolling bearing chamber (4) arranged between the inner and outer rings, a bistable washer (7) capable of selectively taking one of two predetermined configurations, and an annular flange (8) partly delimiting the rolling bearing chamber (4) and mounted on a first ring (3; 2) of the inner and outer rings. The flange (8) extends radially from the first ring (3; 2) and is axially aligned with the second ring (2; 3).

9 Claims, 8 Drawing Sheets

ROLLING BEARING, ITS USE, AND A MOTOR VEHICLE FITTED WITH SUCH A ROLLING BEARING

TECHNICAL FIELD OF THE INVENTION

The present invention relates to a ball or roller bearing such as a clutch-engagement/disengagement thrust bearing, particularly for a motor vehicle, and to a motor vehicle fitted with such a rolling bearing.

BACKGROUND ART OF THE INVENTION

In the motor vehicle field, it is known practice to use a clutch-engagement/disengagement thrust bearing for transmitting a control force to a clutch-disengagement mechanism placed between the output from an engine and a gearbox. Such a clutch-engagement/disengagement thrust bearing must allow the gearbox shaft to rotate, while the engagement mechanism is not rotated. That is why a clutch-engagement/disengagement thrust bearing is usually formed by a ball bearing.

It is furthermore known, for example from FR-A-2 544 429, to use a bistable washer in order to secure a piston for the control of a clutch-engagement/disengagement thrust bearing to the inner ring of this thrust bearing. A deflector delimits a chamber for receiving the balls of the thrust bearing, between its inner and outer rings, and makes it possible to centre the bistable washer in one of its configurations. When a control piston is placed in the thrust bearing, the force for tilting the bistable washer from one of its configurations to its other configuration is exerted by an edge of the inner ring. This force is very localized and the precision of its application depends, in particular, on the precision of production of the inner ring and on the positioning of the bistable washer relative to this ring. In addition, the axial space requirement of this thrust bearing is relatively large, to the extent that the inner ring must be extended up to resting on the bistable washer.

Similar problems are posed with other rolling bearings provided with a bistable washer.

It is these drawbacks that the invention is intended more particularly to remedy by proposing a new ball or roller bearing in which the distribution of the tilting force of a bistable washer, from one of its configurations to its other configuration, may be optimized.

SUMMARY OF THE INVENTION

Accordingly, the invention relates to a rolling bearing comprising an inner ring, an outer ring, rolling members placed in a rolling bearing chamber arranged between the inner and outer rings, a bistable washer capable of selectively taking one of two predetermined configurations and an annular flange partly delimiting the rolling bearing chamber and mounted on a first ring of the inner and outer rings. This rolling bearing is characterized in that the flange extends radially from the first ring and is axially aligned with the second ring.

Thanks to the invention, the force for tilting the bistable washer between its two configurations may be exerted by the flange, the geometry of which may be adapted to this function. In other words, the annular flange serves as a member for transmitting force between the second ring and the bistable washer. Its geometry, on the one hand, and its installation in the thrust bearing, on the other hand, may be easily adapted to this function.

According to advantageous but not obligatory aspects of the invention, a rolling bearing according to the invention may incorporate one or more of the following features:

- The flange is provided, at its radial outer edge or at its radial inner edge, with deformable tabs allowing it to be mounted by being wedged onto the first ring. In this case, the first ring is advantageously provided with a peripheral groove for receiving and wedging the tabs of the flange.
- The flange is provided with a continuous radial edge capable of pressing axially against an edge of the second ring.
- The flange has, between its inner radial edge and outer radial edge, a section that is inclined, relative to a central axis of the flange, at an angle equal or substantially equal to the angle of inclination of a section of the bistable washer, relative to the central axis of this washer, when it is in a first predetermined position, these two sections being axially facing one another when the washer is in this first position. In other words, in the mounted configuration of the thrust bearing, the aforementioned sections of the flange and of the bistable washer are substantially parallel, which makes the transmission of an axial force easier between these sections.
- The flange has, between its inner radial edge and its outer radial edge, a curved section with a convex surface oriented towards said washer. This convex surface advantageously has, at its closest point to the bistable washer, a tangent that is inclined, with respect to the central axis of the flange, at an angle equal or substantially equal to the angle of inclination of a section of the bistable washer, relative to a central axis of this washer, when it is in a first predetermined position, the curved section of the flange and the inclined section of the bistable washer axially facing one another when the washer is in the first position.
- The flange has a cylindrical sleeve which defines its inner radial edge and this cylindrical sleeve is axially aligned with the second ring and with a section of the bistable washer. This sleeve is advantageously integral with the flange and obtained by folding the flange on itself, around a circular line centered on a central axis of the flange, in a direction such that a free edge of the sleeve faces the bistable washer.
- A part of the flange which is axially aligned with the second ring is also aligned with a part of the bistable washer.
- The bistable washer is provided with a continuous radial edge placed axially facing an intermediate section of the flange and capable of resting axially against this section.
- The bistable washer is provided, at its inner radial edge or at its outer radial edge, with deformable tabs allowing it to be wedged into a peripheral groove of a piston for controlling the rolling bearing.
- According to a first embodiment, the inner ring is rotating, while the outer ring is fixed in rotation relative to a central axis of the rolling bearing. According to another embodiment, the outer ring is rotating, while the inner ring is fixed in rotation relative to a central axis of the rolling bearing.

The invention also relates to the use of a rolling bearing as specified above in order to form a clutch-engagement/disengagement thrust bearing of a motor vehicle.

The invention also relates to a motor vehicle fitted with a clutch-engagement/disengagement thrust bearing as specified above. Such a vehicle is more reliable than those of the prior art to the extent that the transmission of force in the clutch-engagement thrust bearing takes place in an optimized manner.

BRIEF DESCRIPTION OF THE DRAWINGS

The invention will be better understood and other advantages of the latter will appear more clearly in the light of the following description of four embodiments of a clutch-engagement/disengagement thrust bearing according to its principle, given only as examples and made with reference to the appended drawings in which.

DETAILED DESCRIPTION OF THE INVENTION

Figure 1:
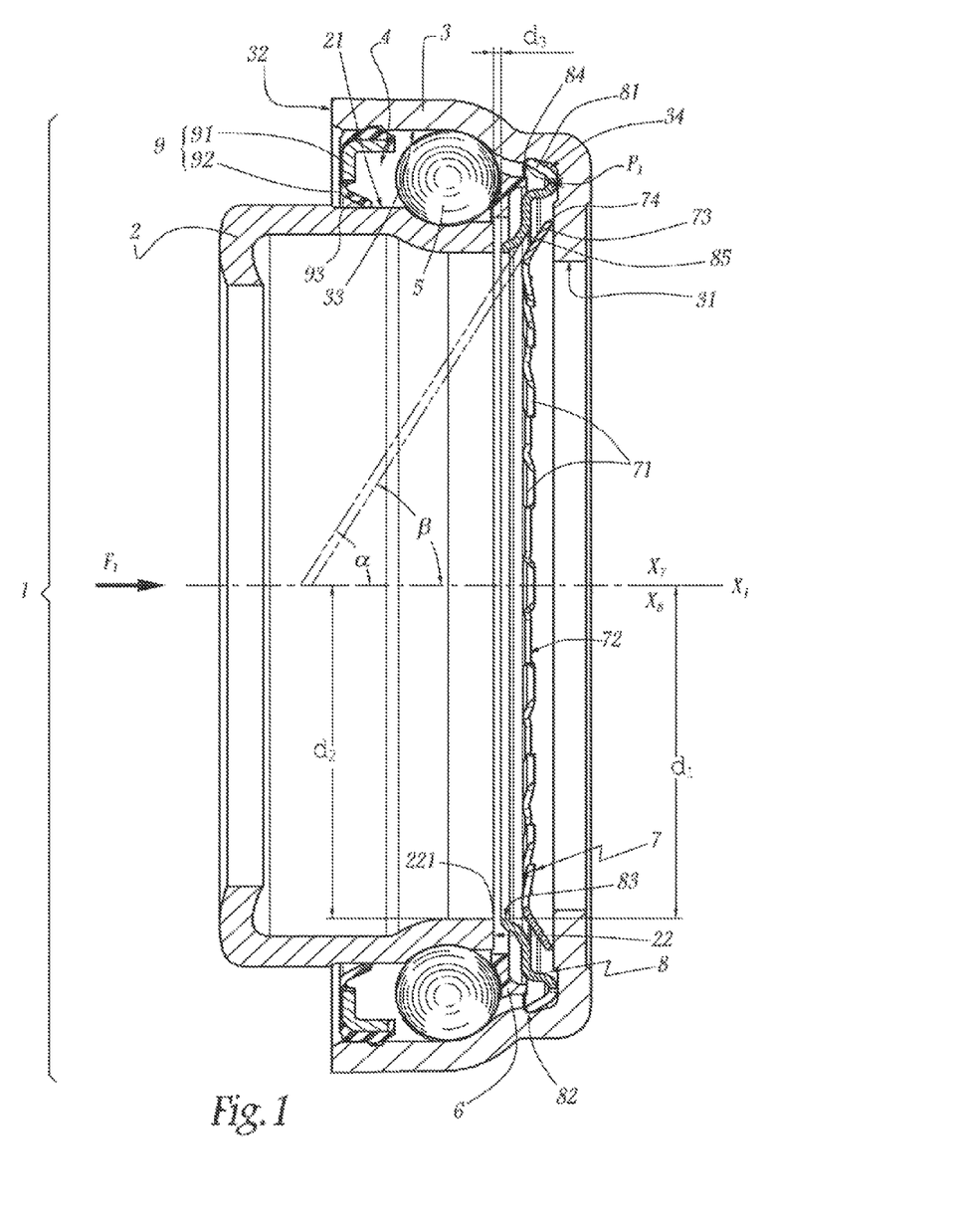
FIG. 1 is an axial section of a clutch-engagement/disengagement thrust bearing according to a first embodiment of the invention.
Figures 2, 3:
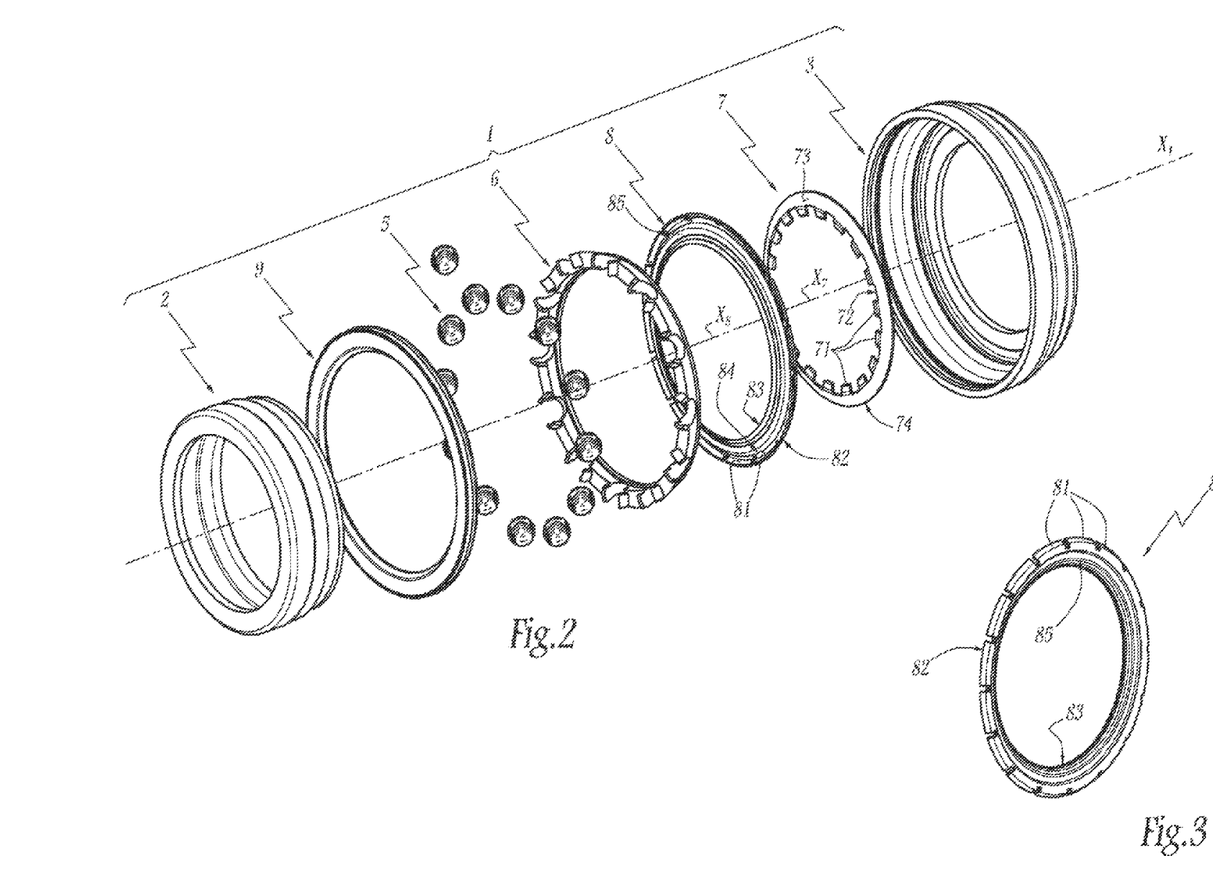
FIG. 2 is an exploded view in perspective of the thrust bearing of FIG. 1.
FIG. 3 is a view in perspective, from another angle, of a flange belonging to the thrust bearing of FIGS. 1 and 2.

The thrust bearing 1 represented in FIGS. 1 to 5 is a rolling bearing which comprises an inner ring 2 and an outer ring 3 defining between them a chamber 4 for receiving a series of balls 5, which are held in place in the chamber 4 by a cage 6. In the configuration of use of the thrust bearing 1, the ring 2 rotates about a central axis $X_1$ of the thrust bearing, while the ring 3 is fixed relative to this axis. The axis $X_1$ forms in practice an axis of symmetry of the rings 2 and 3. As can be seen in FIGS. 1 and 2, the pulley device for a belt or chain tensioning idler or runner roller, referenced 10 in its entirety, comprises a pulley 12, a rolling bearing 14, with a geometric axis 16, an annular spacer 18 and a fastening screw 20 coaxial with the axis 16.

Figure 4:
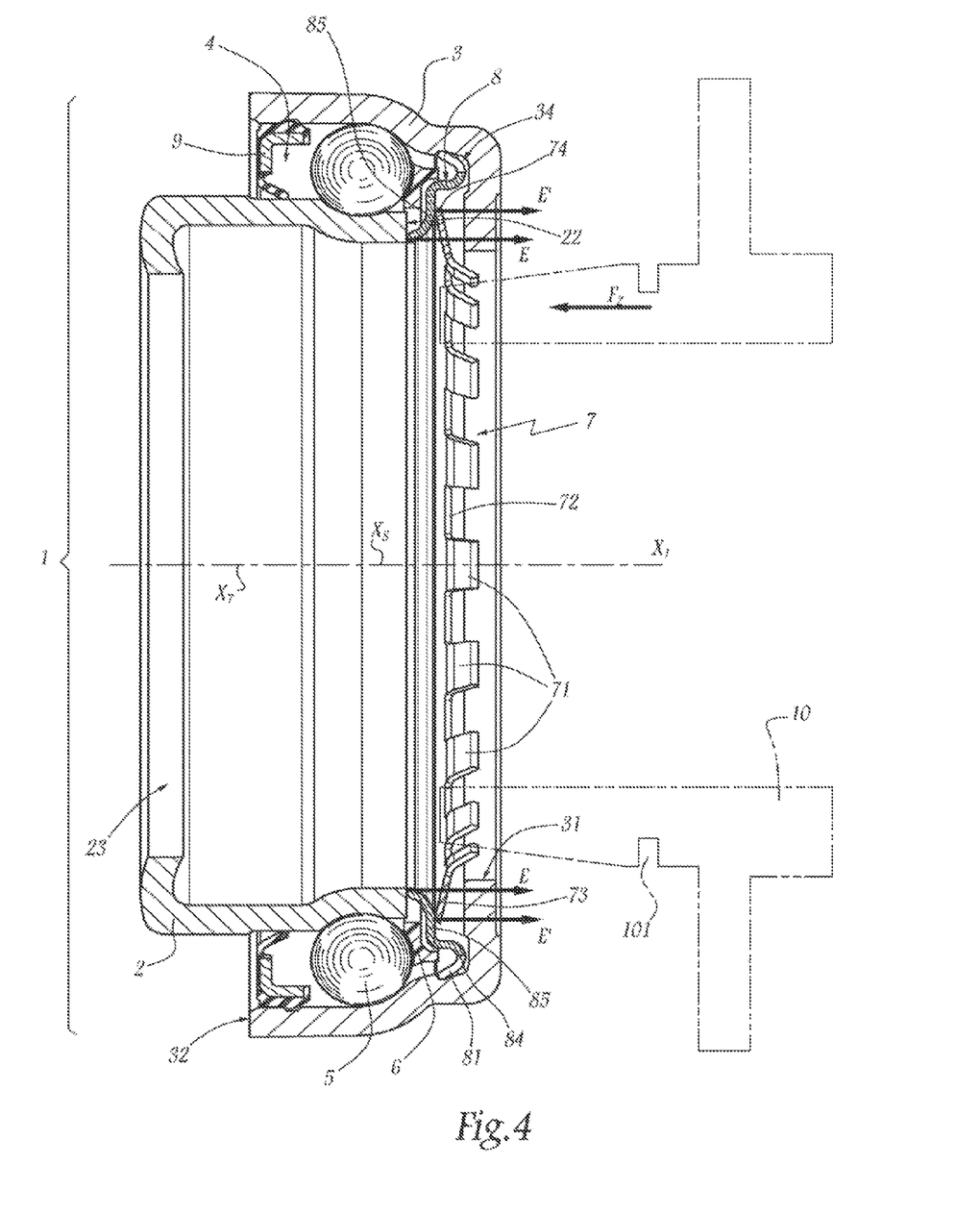
FIG. 4 is a section similar to FIG. 1, during the mounting of the thrust bearing onto a piston for transmitting axial force.
Figure 5:
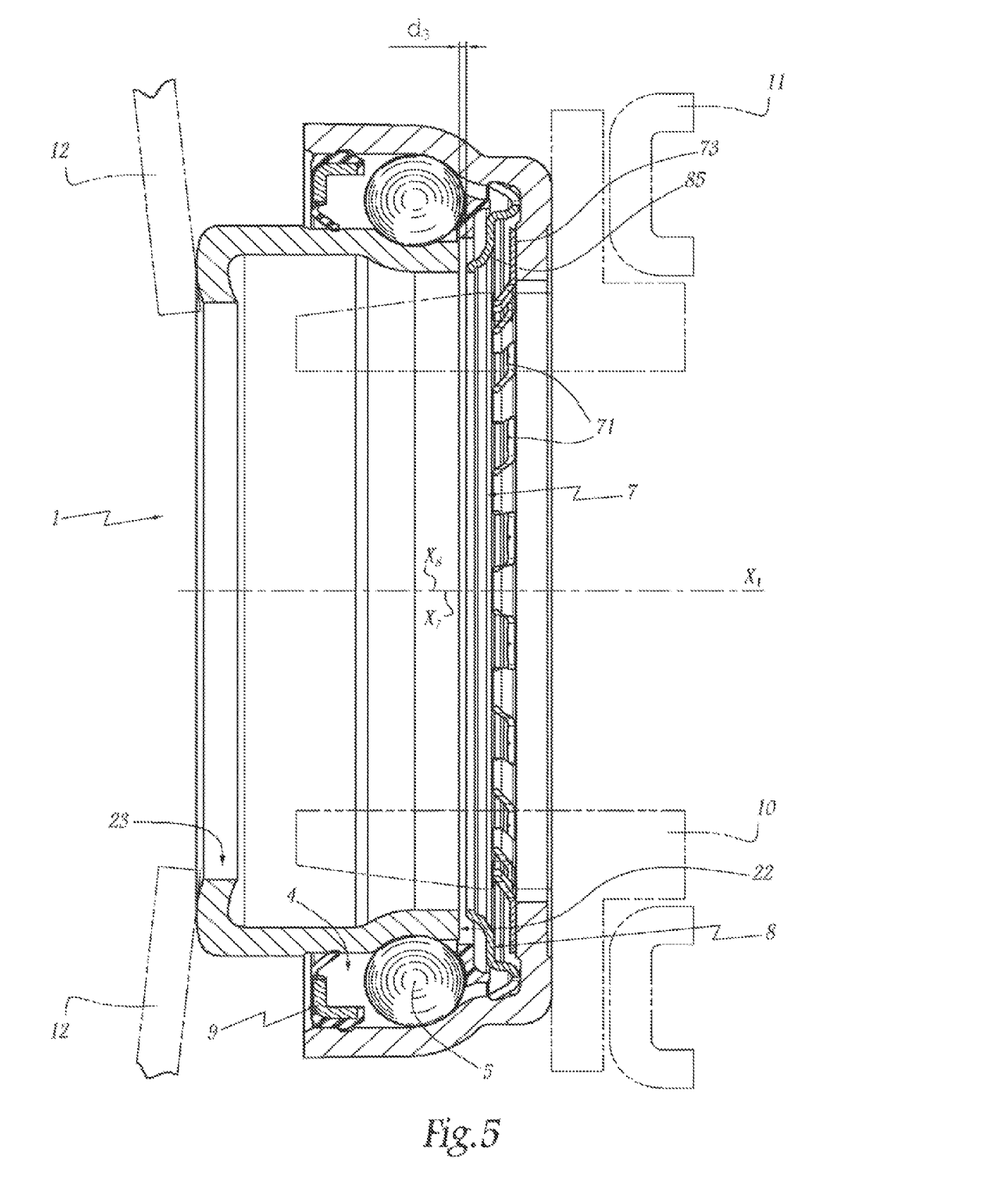
FIG. 5 is a section similar to FIG. 1, while the thrust bearing is in the configuration of use.

A washer 7 is placed between the rings 2 and 3 and may selectively take one of the two positions shown in FIGS. 1 to 4, on the one hand, and in FIG. 5, on the other hand.

The washer 7 is centred on an axis $X_7$ superimposed with the axis $X_1$ in the mounted configuration of the thrust bearing 1. The washer 7 moves, in a reversible manner, from one of its configurations to the other configuration by elastic deformation of tabs 71 which extend towards the axis $X_7$ from its inner radial edge 72, while the washer 7 forms a continuous annular band 73 between its inner radial edge 72 and its outer radial edge 74, itself continuous, that is to say with no tabs.

An annular flange 8 delimits the chamber 4 on the side of an inner edge 31 of the ring 3. The flange 8 is centred on an axis $X_8$ superimposed with the axis $X_1$ in the mounted configuration of the thrust bearing 1. The flange 8 has tabs 81 which define its outer radial edge 82 and which are folded in the direction of the axis $X_8$. The inner radial edge 83 of the flange 8 is continuous, that is to say with no tabs.

The thrust bearing 1 also comprises a seal 9 which delimits the chamber 4 in the vicinity of the outer edge 32 of the ring 3. This seal 9 comprises a metal armature 91 and an elastomer portion 92 pressed by the armature 91 against the inner radial surface 33 of the ring 3. The elastomer portion 92 comprises a lip 93 pressing slidingly against the outer radial surface 21 of the ring 2.

As a variant, it is possible for the seal 9 not to be in contact with the surface 21 but to extend at a short radial distance from the latter, for example 0.1 mm. It is then formed by a flange.

The surface 33 forms, on the side of the edge 31, an inner peripheral groove 34 in which the tabs 81 of the flange 8 can be inserted and wedged by deformation of the tabs 81, which makes it possible to mount the flange 8 onto the ring 3, by wedging and to immobilize these parts relative to one another. The continuous portion of the flange 8, which extends over 360° around the axis $X_1$, then presses against the surface 33 as shown by the point of contact $P_1$ in FIG. 1 which represents a circular line of contact around the axis $X_1$. This provides an impervious connection between the parts 8 and 3, in the vicinity of the base 84 of the tabs 81.

The edge of the ring 2 closest to the edge 31 and to the elements 7 and 8 is marked 22.

The flange 8 extends, in the installed configuration in the ring 3, radially from the groove 34 to axially facing the edge 22. $d_1$ is the distance taken radially relative to the axis $X_1$, between the axes $X_1$ and $X_8$, on the one hand, and the edge 83 of the flange 8 mounted in the ring 3, on the other hand. The edge 22 is in the form of a continuous ring centred on the axis $X_1$ and perpendicular to the latter, with a minimum radius the value of which is substantially equal to the distance $d_1$. The flange 8 extends radially from the zone 34 where it is wedged onto the ring 3, up to the circular inner rim 221 of the edge 22. The radial distance $d_2$ between the rim 221 and the axis $X_1$ has, in practice, a value equal to that of the distance $d_1$.

Therefore, the flange 8 is partly placed axially, that is to say parallel to the axis $X_1$, in the extension of the edge 22 of the ring 2, between the edge 22 and the continuous band 73 of the washer 7, which therefore also extends axially facing the edge 22. In other words, a part of flange 8 is axially aligned with a part of ring 2 and a part of washer 7 is axially aligned with a part of ring 2.

In the configuration of FIG. 1, an intermediate section 85 of the flange 8 is generally shaped like a truncated cone, with a half-angle α at the top relative to the axis $X_8$ of the order of 45°. Furthermore, the band 73 is also in the shape of a truncated cone, with a half-angle β at the top relative to the axis $X_7$ also of the order of 45°. The sections 73 and 85 are axially facing one another in the configuration of FIG. 1. In practice, the angles α and β are chosen to be equal or substantially equal. "Substantially equal" means that these angles have values which differ by less than 10°. In other words, in the configuration of FIG. 1, the sections 73 of the washer 7 and 85 of the flange 8 are inclined relative to the axis $X_1$, which is a central axis for the elements 7 and 8, at substantially the same angle, so that the facing surfaces of the sections 73 and 85 are substantially parallel. This parallelism or quasi-parallelism of the sections 73 and 85 before contact makes it possible to obtain great axial compactness of the rolling bearing 1.

When it is appropriate to mount the rolling bearing 1 on a piston 10 for the transmission of axial force, the user inserts into the rolling bearing 1 which is in the configuration of FIG. 1 a circular sleeve, not shown, in the direction of the arrow $F_1$ in this figure, that is to say via the side opposite to the edge 31. This sleeve pushes the teeth 71 of the washer 7 in order to cause this washer to tilt to the configuration of FIG. 4 in which the edge 74 of the washer rests against the flange 8.

The piston 10 is then inserted into the rolling bearing 1 from the side of this rolling bearing forming the edge 31, as shown by the arrow $F_2$ in FIG. 4. The movement of the piston 10 towards the left in FIG. 4 tends to push the washer 7 and the flange 8, which are resting against one another, until the flange 8 ultimately itself rests against the edge 22 of the ring 2, as shown in FIG. 4. In this position, the ring 2, which is held axially immobile, exerts a resistant force E on the flange 8, this force being transmitted in the form of a corresponding force E' via the flange 8 to the washer 7, at the zone of contact between the edge 74 of the washer 7 and the intermediate section 85 of the flange 8. Therefore, the presence of the flange 8 at the edge 22 of the washer 2 makes it possible to exert an effective force E' on the outer radial edge 74 of the washer 7. This force E' makes it possible to tilt the washer 7 from its first configuration shown in FIGS. 1 and 4 to its second configuration shown in FIG. 5.

The flange 8 is preferably made of a metal chosen from spring steels.

As a variant, it is possible for the flange 8 not to come into contact with the edge 22 in as much as it is sufficiently rigid to exert on its own, on the washer 7, the force E' for tilting to the configuration of FIG. 5.

Continuing the movement $F_2$ for inserting the piston 10 into the rolling bearing 1 has the effect of exerting on the tabs 71 a force which tends to fold them towards the left in FIG. 4, until these tabs enter an outer peripheral groove 101 of the piston 10. Therefore, the bistable washer 7 moves from its configuration in FIG. 4 to its configuration in FIG. 5 by being deformed by the action of the piston 10 and by the resistant force E' exerted by the flange 8.

The position of FIG. 5 is then reached in which a shift fork 11 interacts with the piston 10, while a diaphragm 12 partially shown by its tips rests on the outer ring 3, in the vicinity of its edge 23 furthest from the washer 7.

It should be noted that the flange 8 also has a sealing function to the extent that, before and after the piston 10 is put in place, its edge 83 extends to a short axial distance $d_3$ from the edge 22 which therefore defines a narrow passageway in order to limit the back flow of pollution towards the chamber 4.

Figure 6:
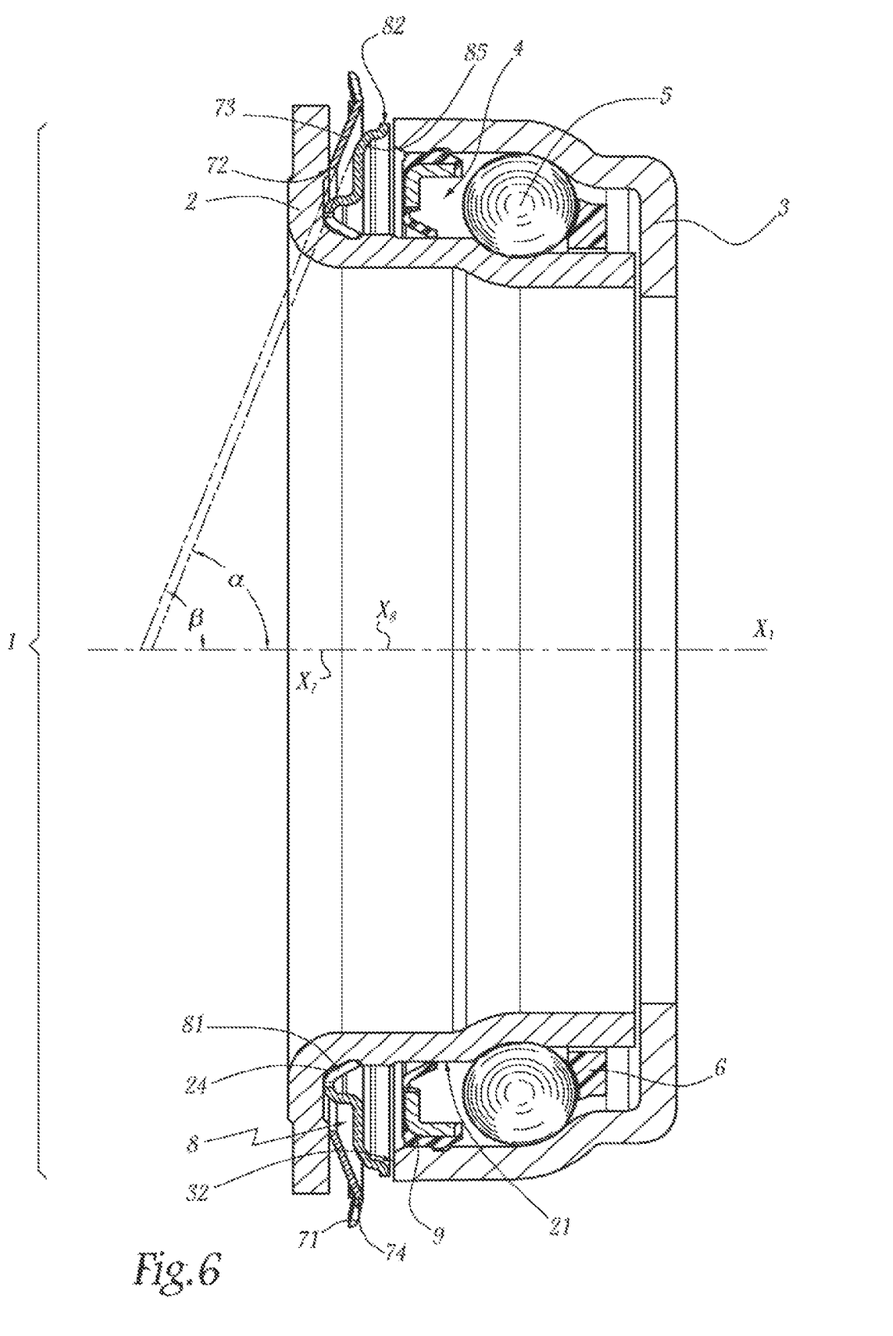
FIG. 6 is a view in section similar to FIG. 1 for a clutch-engagement/disengagement thrust bearing according to a second embodiment of the invention.
Figure 7:
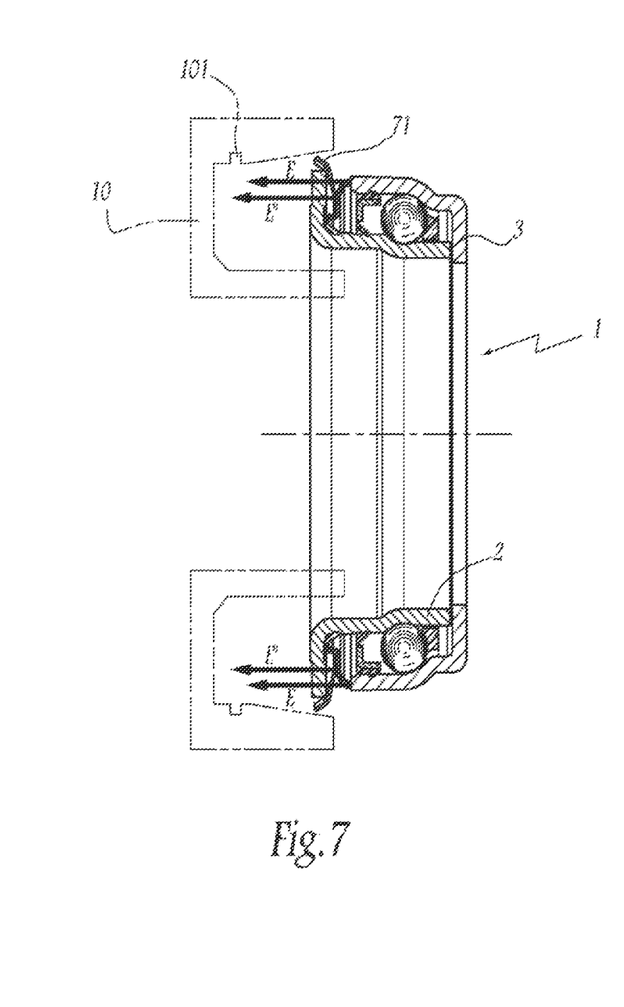
FIGS. 7 and 8 are respectively sections similar to FIGS. 4 and 5, but on a smaller scale, for the thrust bearing of FIG. 6.
Figure 8:
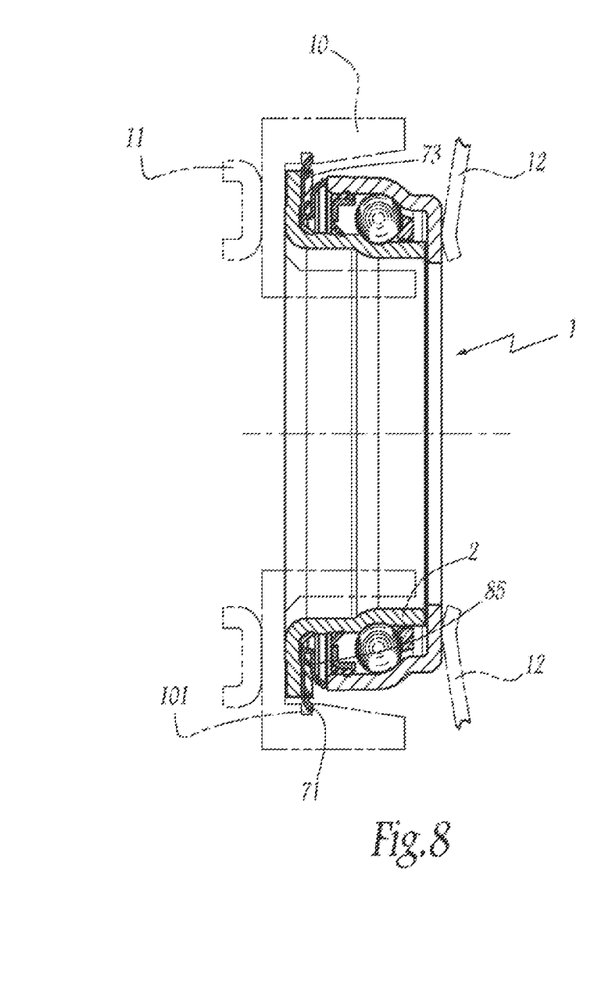

In the second embodiment of the invention shown in FIGS. 6 to 8, the elements similar to those of the first embodiment bear identical reference numbers. This embodiment differs from the preceding embodiment in that the inner ring 2 is rotationally fixed relative to the central axis $X_1$ of the rolling bearing 1, while the outer ring 3 rotates. The bistable washer 7 is provided, in the vicinity of its outer radial edge 74, with tabs 71 designed to be engaged in an internal peripheral groove 101 of a piston 10 to be mounted on the thrust bearing 1 from the outside. As in the first embodiment, this piston 10 makes it possible to transmit an axial force exerted by a fork 11, while the outer ring 3 is in contact with the tips of a diaphragm 12 belonging to a clutch-engagement mechanism.

A flange 8 is provided, at its inner radial edge 83, with tabs 81 for mounting by wedging into a groove 24 arranged in the outer radial surface 21 of the inner ring 2. The flange 8 extends, from the groove 24, into the axial extension of the edge 32 of the ring 3 closest to a seal 9 delimiting the rolling bearing chamber 4 in which balls 5 are placed. In other words, a part of the flange 8 is axially aligned with respect to a part of ring 3. The continuous outer radial edge 82 of the flange 8 is axially facing the edge 32. It is possible for the seal 9 not to be in contact with the surface 21 but to extent a short distance from the latter, itself then being in the form of a flange.

As in the first embodiment, in the configuration of the washer 7 represented in FIG. 6, a section 85 of the flange 8 is substantially parallel to a continuous band 73 of the washer 7 delimited by its inner radial edge 72 and outer radial edge 74. In other words, these sections 85 and 73 of the flange 8 and of the washer 7 are inclined, relative to the central axis $X_1$ of the rolling bearing 1, at angles $\alpha$ and $\beta$ which are equal or substantially equal.

A rolling bearing cage 6 is provided in the chamber 4 in order to guide the balls 5 as in the first embodiment.

As in the first embodiment, a resistant force E exerted axially by the edge 32 on the flange 8 may be transmitted to the washer 7 in the form of a distributed force E' making it possible to make it tilt from its configuration in FIGS. 6 and 7 to its configuration in FIG. 8.

As in the first embodiment, the flange 8 may exert the force E' without coming into contact with the edge 32, insofar as it is rigid enough to tilt the washer 7 from its configuration in FIG. 7 to that in FIG. 8.

In the two configurations of the washer 7, its inner radial edge 72 is axially facing the intermediate section 85 of the flange 8 and facing the edge 32.

Figure 9:
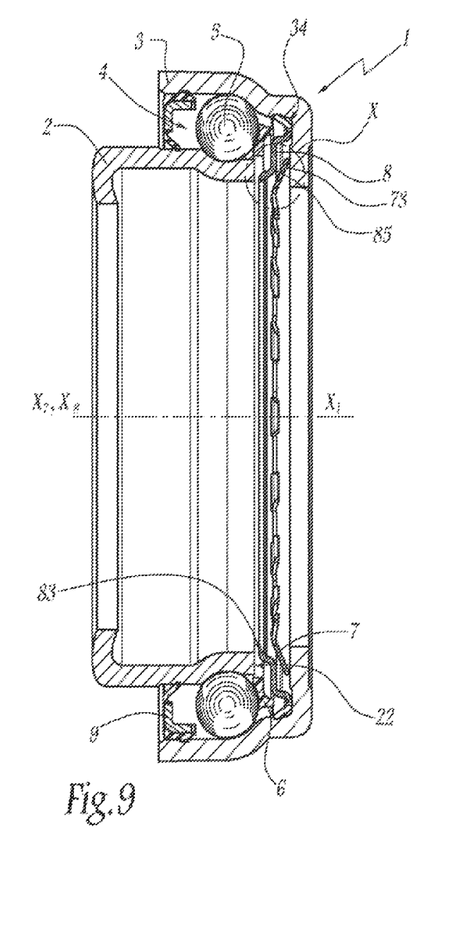
FIG. 9 is a section similar to FIG. 6, on a smaller scale, for a clutch engagement/disengagement thrust bearing according to a third embodiment of the invention.
Figure 10:
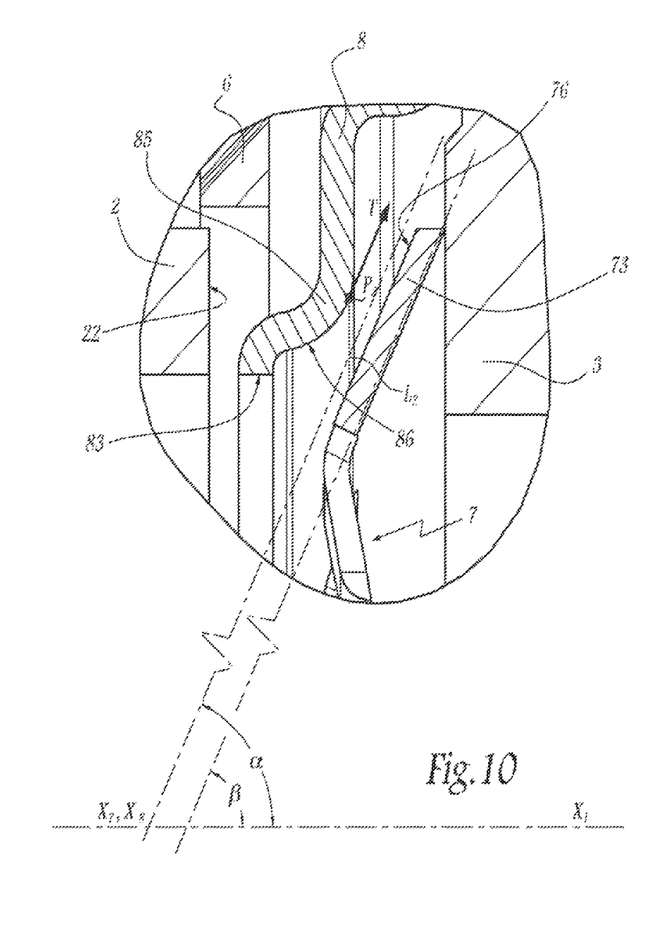
FIG. 10 is an enlarged view of detail X on FIG. 9.
Figure 11:
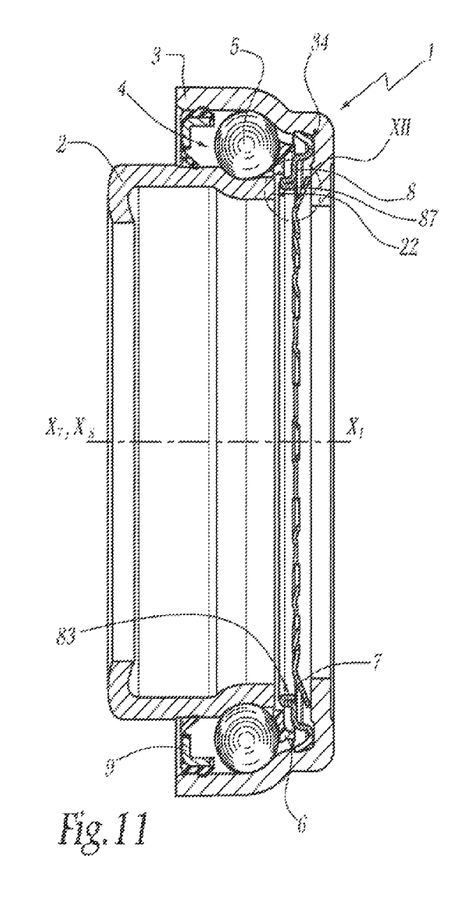
FIG. 11 is a section similar to FIG. 6, on a smaller scale, for a clutch engagement/disengagement thrust bearing according to a fourth embodiment of the invention.
Figure 12:
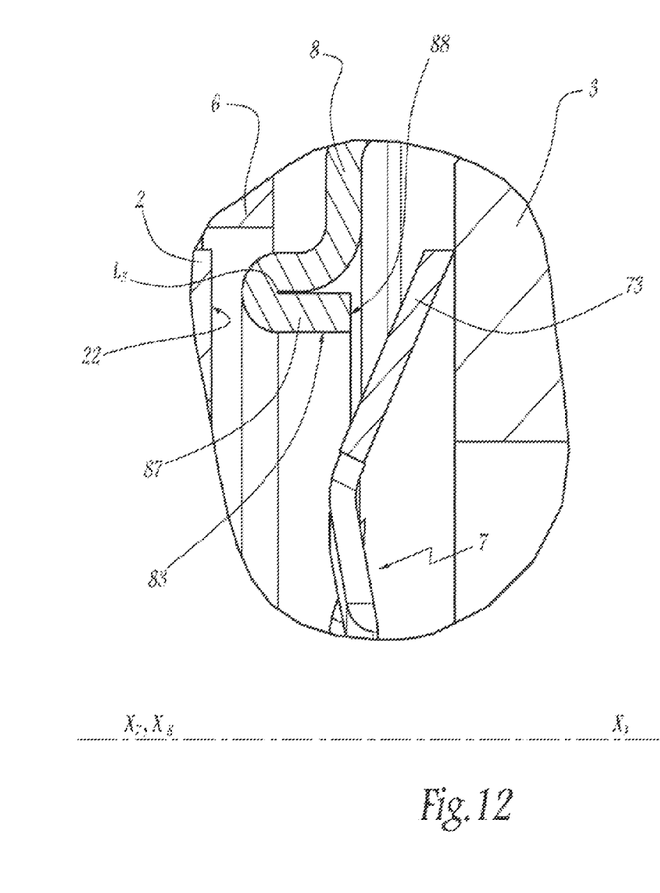
FIG. 12 is an enlarged view of detail XII on FIG. 11.

In the third and fourth embodiments respectively represented on FIGS. 9 and 10, and on FIGS. 11 and 12, the elements similar to those of the first embodiment bear identical reference numbers. Unless otherwise specified, similar elements of the third and fourth embodiments are identical and work in the same way as in the first embodiment.

In the third and fourth embodiments, a rolling bearing 1 comprises an inner ring 2, an outer ring 3 and a series of balls 5 held in position by a cage 6 within a rotation chamber 4. A bistable washer 7 is used as in the first embodiment. A seal 9 closes the rotation chamber 4 on one side. Items 2 to 7 and 9 are identical to the ones having the same references in the first embodiment.

In each of these two embodiments, an annular flange 8 closes the rotation chamber on its other side and is centered on an axis $X_8$ which is superimposed with a central axis $X_1$ of the rolling bearing in the mounted configuration of this bearing. Each flange 8 is wedged on an inner peripheral groove 34 of the outer ring 3, as the flange of the first embodiment.

These flanges 8 extend radially from the outer ring 3 and towards the central axis $X_1$, so that their respective inner radial edges 83 are axially aligned, along a direction parallel to axis $X_1$, with the edge 22 of the inner ring 2.

In the third embodiment, a curved portion 85 of the flange 8 is located, axially, between the edge 22 of the inner ring 2 and a section 73 of the bistable washer 7.

The surface 86 of section 85 which is oriented towards washer 7 is convex and $P_2$ denotes the closest point of this surface with respect to the facing surface 76 of section 73. Actually, a set of points $P_2$ exists on surface 86, along a circular line $L_2$ centered on axis $X_1$.

One considers a tangent T to surface 86 at point $P_2$. This tangent makes an angle $\alpha$ of about 45° with respect to axis $X_1$.

As in the first embodiment, the band or section 73 of bistable washer 7 is in the shape of a truncated cone, with a half-angle $\beta$ at the top, relative to the central axis $X_7$ of washer 7, also of the order of 45°. In the mounted configuration of rolling bearing 1, axes $X_1$ and $X_7$ are superimposed. Therefore, a tangent T to section 85 at point $P_2$ is substantially parallel to section 73 of bistable washer 7.

One considers that tangent T is representative of a mean inclination angle of section 85. In such a case, section 85 can be considered to be inclined, with respect to axis $X_8$, at angle α which is equal to angle β.

Actually, angles α and β can be "substantially equal", that is with values which differ by less than 10°.

This parallelism or quasi-parallelism of sections 85 and 73 makes it possible to obtain a great axial compactness of rolling bearing 1.

In the fourth embodiment, flange 8 includes an annular sleeve 87 which is integral with the rest of flange 8 and defines its inner radial edge 83. Actually, sleeves 87 is obtained by bending flange 8 internally on itself, around a circular line $L_3$ centered on the central axis $X_8$ of flange 8.

Therefore, sleeve 87 is axially aligned with edge 22 of inner ring 2 and with section 73 of bistable washer 7, this section being defined as in the first embodiment. A free edge 88 of sleeve 87, opposite to bending line $L_3$, is opposite to section 73 of bistable washer 7, along a direction parallel to axis $X_1$.

The structure and shape of flange 8 at the level of sleeve 87 makes it very rigid and avoids a plastic deformation of the flange when it transmits an effort between ring 2 and bistable washer 7, as explained with respect to the first embodiment.

Irrespective of the embodiment, the invention may be applied with rollers instead of the balls 5.

The features of the different embodiments considered here-above might be combined in the framework of the invention defined by the appended claims.

The invention may be applied to ball or roller bearings other than a clutch-engagement/disengagement thrust bearing, these rolling bearings having to be immobilized axially on a shaft by means of a bistable washer.

A motor vehicle fitted with a rolling bearing as described above is more reliable than those of the prior art since the service life of this rolling bearing is enhanced.

The invention claimed is:

1. A rolling bearing comprising:
   an inner ring,
   an outer ring spaced from the inner ring such that a rolling bearing chamber is defined between the inner ring and the outer ring,
   a plurality of rolling members disposed in the rolling bearing chamber,
   a bistable washer selectively disposable in one of two predetermined configurations, and
   an annular flange partly delimiting the rolling bearing chamber and disposed on one of the inner ring and the outer ring, the annular flange extending radially from the one ring and being generally axially aligned with the other one of the inner ring and the outer ring, wherein the bistable washer and the annular flange are jointly interposed between the inner ring and the outer ring;
   the other one of the inner ring and the outer ring having an inner edge facing in an axial direction, the annular flange has a continuous radial edge configured for pressing axially against the inner edge of the other one of the inner ring and the outer ring, the annular flange in its free state not being in contact with the other one of the inner ring and the outer ring;
   a seal disposed between the inner ring and the outer ring to partly delimit a side of the rolling bearing chamber opposite from a side of the rolling bearing chamber delimited by the annular flange, wherein the seal comprises a metal armature and an elastomer portion, the elastomer portion comprising a lip pressing slidingly against an outer radial surface of the inner ring, a portion of the metal armature extending axially along a portion of the elastomer portion that is in contact with the outer ring and having another portion extending radially toward the inner ring from the portion of the metal armature that extends axially.

2. The rolling bearing according to claim 1, wherein the annular flange has a radial outer edge, a radial inner edge and deformable tabs formed at one of the radial inner edge and the radial outer edge and configured to be wedged onto the one of the inner ring and the outer ring so as to mount the annular flange to the one ring of the inner ring and the outer ring.

3. The rolling bearing according to claim 2, wherein the one of the inner ring and the outer ring has a peripheral groove for receiving and wedging the tabs of the annular flange.

4. The rolling bearing according to claim 1, wherein:
   the bistable washer has a central axis and a section inclined at a first angle with respect to the central axis of the bistable washer when the bistable washer is disposed in the one of the two predetermined configurations,
   the annular flange has a central axis, an inner radial edge, an outer radial edge, and a section that is inclined relative to the central axis of the annular flange by a second angle substantially equal to the first angle of the bistable washer inclined section, the inclined section of the annular flange and the inclined section of the bistable washer being generally axially facing when the bistable washer is in the one of the two predetermined configurations.

5. The rolling bearing according to claim 1, wherein a part of the annular flange is axially aligned with the other one of the inner ring and the outer ring and with a part of the bistable washer.

6. The rolling bearing according to claim 1, wherein the annular flange has an intermediate section and the bistable washer has a continuous radial edge axially facing the intermediate section of the annular flange and disposable axially against the annular flange intermediate section.

7. The rolling bearing according to claim 1, wherein the bistable washer has an inner radial edge, an outer radial edge, and deformable tabs formed at one of the inner edge and the outer edge, the tabs being configured to be wedged into a peripheral groove of a piston for controlling the rolling bearing.

8. The rolling bearing according to claim 1, wherein the inner ring is rotatable while the outer ring remains fixed relative to a central axis of the rolling bearing.

9. The rolling bearing according to claim 1, wherein the rolling bearing is a clutch-engagement/disengagement thrust bearing of a motor vehicle.

* * * * *